(12) United States Patent
Park et al.

(10) Patent No.: US 8,164,661 B2
(45) Date of Patent: Apr. 24, 2012

(54) METHOD AND APPARATUS FOR ELIMINATING DEFECTIVE PIXELS AND NOISE

(75) Inventors: Min-Kyu Park, Seoul (KR); Sung-Dae Cho, Yongin-si (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 687 days.

(21) Appl. No.: 12/332,429

(22) Filed: Dec. 11, 2008

(65) Prior Publication Data

US 2009/0154826 A1    Jun. 18, 2009

(30) Foreign Application Priority Data

Dec. 12, 2007    (KR) .................. 10-2007-0128939

(51) Int. Cl.
*G06K 9/40*    (2006.01)

(52) U.S. Cl. ...................................... 348/246; 382/260

(58) Field of Classification Search .................. 348/246, 348/247, 241; 250/208.1; 382/260
See application file for complete search history.

(56) References Cited

U.S. PATENT DOCUMENTS

| | | | |
|---|---|---|---|
| 6,625,318 B1* | 9/2003 | Tan et al. | 382/224 |
| 6,965,395 B1* | 11/2005 | Neter | 348/129 |
| 7,388,609 B2* | 6/2008 | Pinto et al. | 348/246 |
| 2006/0257046 A1* | 11/2006 | Rai et al. | 382/275 |
| 2007/0097237 A1* | 5/2007 | Kono | 348/246 |
| 2007/0098245 A1* | 5/2007 | Mylaraswamy et al. | 382/141 |
| 2007/0253636 A1* | 11/2007 | Okada | 382/264 |
| 2008/0112639 A1* | 5/2008 | Min et al. | 382/264 |
| 2008/0152230 A1* | 6/2008 | Forutanpour | 382/209 |
| 2008/0205747 A1* | 8/2008 | Kuchii | 382/149 |
| 2008/0290283 A1* | 11/2008 | Tomaney et al. | 250/370.08 |
| 2009/0046927 A1* | 2/2009 | Chiang | 382/167 |

* cited by examiner

*Primary Examiner* — David Ometz
*Assistant Examiner* — Fayez Bhuiyan
(74) *Attorney, Agent, or Firm* — Cha & Reiter, LLC

(57) ABSTRACT

A method and apparatus for eliminating defective pixels and noise in which each pixel value of an image is extracted using a color filter. A mean value of the extracted image is calculated A noise variance, a first threshold for determining whether a pixel is defective, and a second threshold for calculating a weight value for a pixel are all estimated from the mean value. There is a determination as to whether each pixel is defective, and a weight value, a weighted signal mean and a weighted signal variance of the each pixel are all calculated, and noise eliminated from the image using the noise variance, the weighted signal mean, and the weighted signal variance.

17 Claims, 4 Drawing Sheets

| R | Gr | R | Gr | R |
|---|---|---|---|---|
| Gb | B | Gb | B | Gb |
| R | Gr | R | Gr | R |
| Gb | B | Gb | B | Gb |
| R | Gr | R | Gr | R |

FIG.3A

| B | Gb | B | Gb | B |
|---|---|---|---|---|
| Gr | R | Gr | R | Gr |
| B | Gb | B | Gb | B |
| Gr | R | Gr | R | Gr |
| B | Gb | B | Gb | B |

FIG.3B

| Gr | R | Gr | R | Gr |
|---|---|---|---|---|
| B | Gb | B | Gb | b |
| Gr | R | Gr | R | Gr |
| B | Gb | B | Gb | b |
| Gr | R | Gr | R | Gr |

FIG.3C

| Gb | B | Gb | B | Gb |
|---|---|---|---|---|
| R | Gr | R | Gr | R |
| Gb | B | Gb | B | Gb |
| R | Gr | R | Gr | R |
| Gb | B | Gb | B | Gb |

FIG.3D

| in[r-2][c-2] | in[r-2][c-1] | in[r-2][c] | in[r-2][c+1] | in[r-2][c+2] |
|---|---|---|---|---|
| in[r-1][c-2] | in[r-1][c-1] | in[r-1][c] | in[r-1][c+1] | in[r-1][c+2] |
| in[r][c-2] | in[r][c-1] | in[r][c] | in[r][c+1] | in[r][c+2] |
| in[r+1][c-2] | in[r+1][c-1] | in[r+1][c] | in[r+1][c+1] | in[r+1][c+2] |
| in[r+2][c-2] | in[r+2][c-1] | in[r+2][c] | in[r+2][c+1] | in[r+2][c+2] |

FIG.4A

| S0 | S1 | S0 | S1 | S0 |
|---|---|---|---|---|
| S2 | S3 | S2 | S3 | S2 |
| S0 | S1 | S0 | S1 | S0 |
| S2 | S3 | S2 | S3 | S2 |
| S0 | S1 | S0 | S1 | S0 |

FIG.4B

METHOD AND APPARATUS FOR ELIMINATING DEFECTIVE PIXELS AND NOISE

CLAIM OF PRIORITY

This application claims the benefit under 35 U.S.C. §119(a) of a Korean Patent Application filed in the Korean Intellectual Property Office on Dec. 12, 2007 and assigned Serial No. 2007-128939, the entire disclosure of which is hereby incorporated by reference in its entirety.

BACKGROUND OF THE INVENTION

1. Field of the Invention

The present invention generally relates to an image processing technique using an image input sensor, such as, a Complementary Metal-Oxide Semiconductor (CMOS) and a Charge Coupled Device (CCD). More particularly, the present invention relates to a method for eliminating defective pixels and thermal noise that are produced from an image input sensor.

2. Description of the Related Art

An image input sensor such as a CMOS or a CCD creates defective pixels and thermal noise due to process defects or shortcomings of the sensor itself. There are three main known methods for eliminating the defective pixels and the noise.

One of the known methods is to eliminate high frequency components by averaging pixel values within a predetermined mask using a mean filter. This average filtering method has at least two major problems. When there are Laplacian noise characteristics as in defective pixels, the noise is not easily removed. Although the average filtering method is effective in eliminating typical thermal noise, the image quality is degraded because the high frequency components are removed from an image during the filtering process.

Another known method is to arrange values within a predetermined mask using a median filter, and selecting a median value from among the values. Despite the benefits of high effectiveness in Laplacian noise elimination and good preservation of edges, there is a problem in that edge components with small values are removed like noise.

The other method is to use a weighted mean filter, expressed as $$\text{out}[r][c] = \text{mean}[r][c] + \frac{\text{var}(\text{in}[r][c])}{\text{var\_noise} + \text{var}(\text{in}[r][c])} \quad (1)$$

where r denotes the vertical-axis coordinate of an image, c denotes the horizontal-axis coordinate of the image, in[r][c] denotes the input pixel value at the [r][c] coordinates, out[r][c] denotes the output pixel values of the [r][c] coordinates, mean[r][c] denotes the mean of the [r][c] point, var[r][c] denotes the variance of the [r][c] point, and var_noise denotes a noise variance.

When the noise variance is larger than the energy of the input signal, the output approaches the mean, thus eliminating the noise. If the variance of a signal, such as an edge area, is larger than the noise variance, the output approaches the original signal in[r][c]. Therefore, the above-described method determines the output value depends in part on whether the image is an edge area and depends on the level of the noise.

Most of defective pixel and noise elimination methods proposed so far do not specify estimation of the level of noise. Thus, conventionally, the level of noise is estimated using a user-estimated-and-set parameter, or by separating a non-edge area from an image. The former does not eliminate noise reliably, whereas the latter requires a large volume of computation for the noise level estimation. Moreover, mean filters including weighted average filters do not perform well in eliminating defective pixels that are a kind of Laplacian noise, and median filters are not efficient in noise elimination, while preserving linearity.

SUMMARY OF THE INVENTION

An aspect of exemplary embodiments of the present invention is to provide a method for simultaneously eliminating defective pixels and noise from an image during processing the image.

In accordance with an exemplary embodiment of the present invention, there is provided a method for eliminating defective pixels and noise in an image sensor, in which each pixel value of an image is extracted using a color filter, a mean value of the extracted image is calculated, estimation of: a noise variance, a first threshold for determining whether a pixel is defective, and a second threshold for calculating a weight value for a pixel, from the mean value. There is determination whether each pixel is defective, and the calculation of: a weight value, a weighted signal mean and a weighted signal variance of the each pixel are calculated, and a noise is eliminated from the image using the noise variance, the weighted signal mean, and the weighted signal variance.

In an exemplary aspect of the invention, an apparatus for eliminating defective pixels and noise in an image sensor, includes:

means for extracting each pixel value of an image using a color filter;

means for calculating a mean value of the extracted image;

means for estimating a noise variance, a first threshold for determining whether a pixel is defective, and a second threshold for calculating a weight value for a pixel, from the mean value;

means for determining whether each pixel is defective;

means for calculating a weight value for the each pixel and calculating a weighted signal mean and a weighted signal variance of each pixel; and means for eliminating noise from the image using the noise variance, the weighted signal mean, and the weighted signal variance.

BRIEF DESCRIPTION OF THE DRAWINGS

The above features and advantages of certain exemplary embodiments of the present invention will be more apparent from the following detailed description taken in conjunction with the accompanying drawings, in which:

FIGS. 3A to 3D illustrate exemplary Bayer filters that can be used in the present invention; and FIGS. 4A and 4B illustrate an exemplary mask used for determining defective pixels according to an exemplary embodiment of the present invention.

Throughout the drawings, the same drawing reference numerals will be understood to refer to the same elements, features and structures.

DETAILED DESCRIPTION

The matters defined in the description, such as a detailed construction and elements, are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions may have been omitted so as to not obscure appreciation of the present invention by a person of ordinary skill in the art, as well, in addition to clarity and conciseness reasons.

Figure 1:
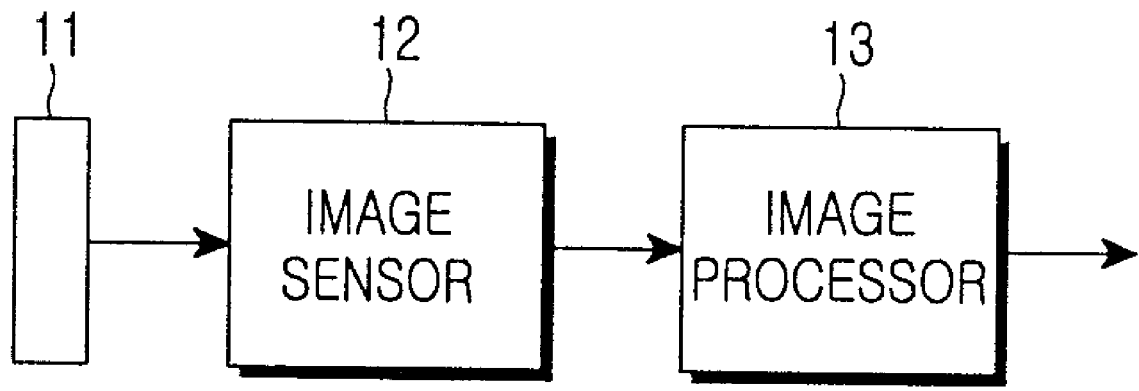
FIG. 1 is a block diagram of an image input apparatus according to an exemplary embodiment of the present invention.

FIG. 1 is a block diagram of an image input apparatus according to an exemplary embodiment of the present invention. Referring to FIG. 1, the image input apparatus includes a lens system 11 for focusing light onto one spot, an image sensor 12 configured with a CMOS or a CCD, for opto-electrically converting an input optical signal to an electrical signal, and an image processor 13 for processing an input image signal received from the image sensor 12.

Now referring to FIG. 1, an optical signal incident on the lens system 11 is provided to the image sensor 12. The image sensor 12 opto-electrically converts the optical signal to an analog electrical signal (potential). For the input of the electrical signal, the image processor 13 processes a Red, Green, and Blue (RGB) image signal, eliminates defective pixels and noise from the noise signal, and performs other operations including but not limited to interpolation and pixel compensation. Data processed by the image processor 13 is transmitted to an external interface or a peripheral interface. The image sensor 12 can be a monochrome sensor or a color sensor. In the case of a color image sensor, a color filter array, typically a 'Bayer' color filter array is used.

In accordance with an exemplary aspect of the present invention, an image processing method includes the mean of an image extracted by use of the 'Bayer' filters in the image sensor is calculated, the level of the noise is determined based on the mean, defective pixels are detected according to the noise level, the defective pixels are eliminated, and noise is eliminated from the image by computing a weighted signal mean and a weighted signal variance. This image processing method will be described below in detail.

Figure 2:
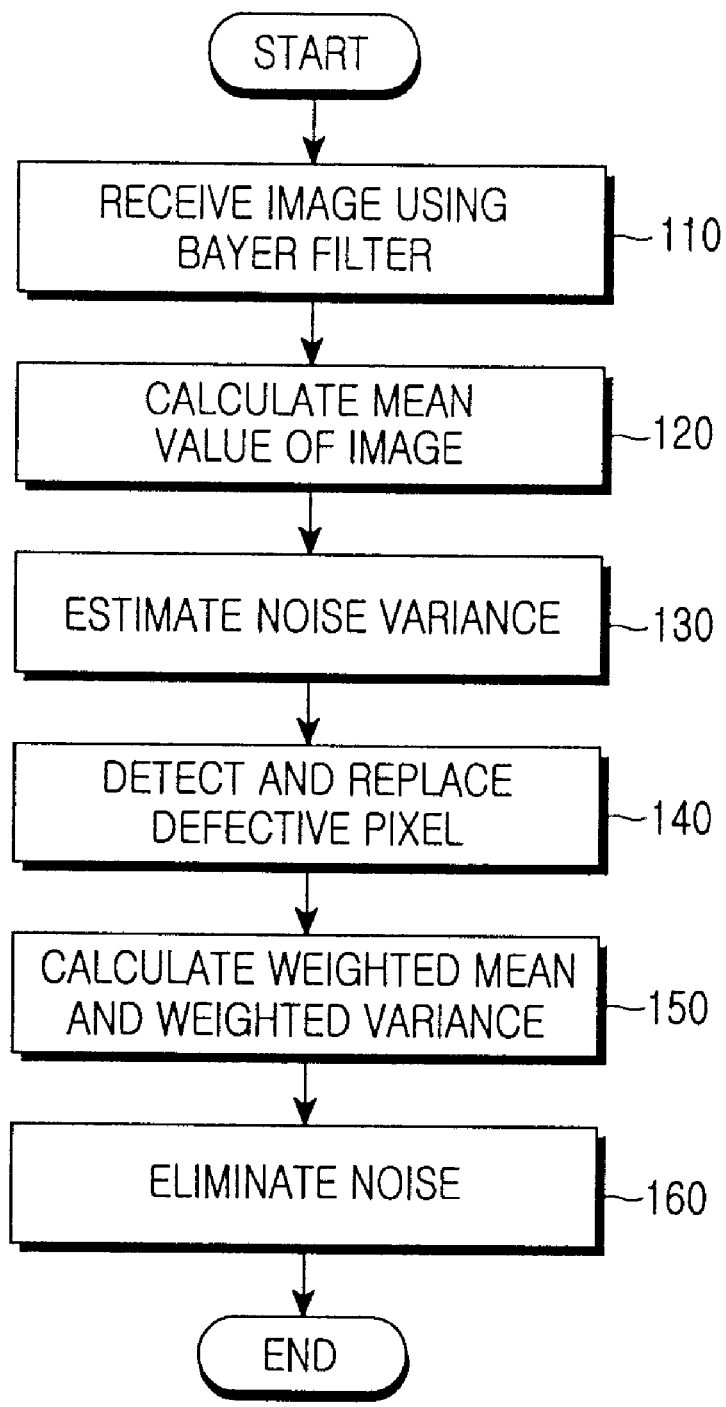
FIG. 2 is a flowchart illustrating an operation for eliminating defective pixels and noise according to an exemplary embodiment of the present invention.

FIG. 2 is a flowchart illustrating an operation for eliminating defective pixels and noise according to an exemplary embodiment of the present invention. Referring to FIG. 2, an image signal is extracted from the image sensor using a 'Bayer' filter in step 110.

FIGS. 3A to 3D illustrate exemplary 'Bayer' filters used in the present invention. Because the human eye is twice more sensitive to green than red or blue, more Green pixels are needed during image recovery. A 'Bayer' pattern is characterized by alternate Red and Green pixels and alternate Blue and Green pixels and thus has twice more Green pixels than Red or Blue pixels. Accordingly, data with one of Red, Green and Blue values in each pixel is obtained using the 'Bayer' color filters, as illustrated in FIGS. 3A to 3D. Green has a different sensitivity depending on whether it is adjacent to Red or Blue and thus there are four cases illustrated in FIGS. 3A to 3D according to four pixels R, B, Gr and Gb.

Referring now to the flowchart in FIG. 2, in step 120, the mean of the image extracted from the 'Bayer' filter is calculated by Algorithm 1.

[Algorithm 1]

```
for(r = 0;r < row;r + +){
    for(c = 0;c < col;c + +){
        mean+ = in[r][c]/ row/ col
    }
}
```

In Algorithm 1, r denotes the vertical-axis coordinate of an image, c denotes the horizontal-axis coordinate of the image, in[r][c] denotes the input pixel values of the [r][c] coordinates, row denotes the length of the image, and col denotes the width of the image. Algorithm 1 computes the mean of the image by dividing each pixel value of the image by the length and width of the image and summing the division values.

Next, in step 130, a first threshold, Td for detecting defective pixels, a second threshold, Tm for a mean value used to eliminate noise, and a noise variance, Vn are estimated from the mean value computed by Algorithm 1. In general, the typical noise of a sensor, (i.e. thermal noise being Possion noise) increases by the square root times of brightness as the energy of a signal expressed as brightness increases. Hence, as the brightness increases, the noise relatively decreases. In contrast, while defective pixels always exist, they are remarkably increased in number under a low luminance. Therefore, more defective pixels and a higher noise level are observed when an image is darker. Relying on the aforementioned, the present invention determines the noise level from the mean value. Td, Tm, and Vn are determined according to mean ranges as illustrated in Table 1 below, according to the present invention.

TABLE 1

|  | Td | Tm | Vn |
|---|---|---|---|
| mean < I080 | I020 | I060 | $(I016)^2$ |
| I080 ≦ mean < I120 | I040 | I055 | $(I015)^2$ |
| I120 ≦ mean < I160 | I060 | I050 | $(I014)^2$ |
| I160 ≦ mean < I200 | I080 | I045 | $(I013)^2$ |
| I200 ≦ mean < I240 | I100 | I040 | $(I012)^2$ |
| I240 ≦ mean < I180 | I120 | I035 | $(I011)^2$ |
| I280 ≦ mean | I140 | I035 | $(I010)^2$ |

In Table 1, I*** represents a percentage of the highest brightness. For example, for an 8-bit image, the maximum value is 256 ($=2^8$) and I010 is 1% of the highest brightness, i.e. 2.56 ($=256 \times \frac{1}{100}$). For a 10-bit image, the maximum value is 1024 ($=2^{10}$) and I120 is 12% of the highest brightness, i.e. 122.88 ($=1024 \times \frac{12}{100}$).

Referring back to FIG. 2, in step 140, defective pixels are detected based on the noise level estimated using Table 1 and replaced with the mean values of their surrounding pixels.

FIGS. 4A and 4B illustrate an exemplary mask used for determining defective pixels according to an exemplary embodiment of the present invention. The determination is made as to whether a pixel is defective using the 5×5 mask illustrated in FIGS. 4A and 4B in step 140. FIG. 4A illustrates pixel positions. In the 5×5 mask, r denotes a vertical-axis coordinate, c denotes a horizontal-axis coordinate, and in[r][c] denotes a target pixel in the 5×5 mask. In FIG. 4B, S0 to S3 represent pixel types. For example, if a target pixel is R in the 'Bayer' filter illustrated in FIG. 3, S0 is R, S1 is Gr, S2 is Gb, and S3 is B. To determine whether the target pixel is defective, the differences between the target pixel and its neighbor pixels and the differences between the neighbor pixels are computed by:

$$DV_{S2}=|in[r-1][c]-in[r+1][c]|$$

$$DH_{S1}=|in[r][c-1]-in[r][c+1]|$$

$$DH1_{S0}=|in[r][c-2]-in[r][c]|$$

$$DH2_{S0}=|in[r][c]-in[r][c+2]|$$

$$DV1_{S0}=|in[r-2][c]-in[r][c]|$$

$$DV2_{S0}=|in[r][c]-in[r+2][c]| \quad (2)$$

where in[r][c] denotes a pixel value at the center of the 5×5 mask. It is determined whether the target pixel is defective using Td estimated according to the result of equation (2) referring to Table 1 by $$DV_{S2}+Td>DV1_{S0},\ DV_{S2}+Td>DV2_{S0},\ DH_{S1}+Td>DH2_{S0} \quad (3)$$

If the target pixel satisfies all of the above four conditions described as equation (3), the target pixel is determined to be defective. If the target pixel does not satisfy at least one of the conditions, it is determined to be normal.

When the target pixel in[r][c] turns out defective, it is replaced with $$\frac{in[r-1][c-1]+in[r-1][c+1]+in[r+1][c-1]+in[r+1][c+1]}{4} \quad (4)$$

That is, the mean value of pixels over, under, on the left to, on the right to the defective pixel substitutes for the defective pixel.

In step 150, a weighted signal mean and a weighted signal variance are computed. First, the weighted signal average is computed by Algorithm 2 and Algorithm 3 using Tm estimated referring to Table 1.

---
[Algorithm 2]
---
```
for(i = -2; i < 3; i+ = 2){
    for(j = -2; j < 3; j+ = 2){
        weight _ mean[r][c]+ = in[r + i][c + j]× weight[r + i][c + j]/
        Sum _ weight
    }
}
```
---

In Algorithm 2, weight_mean[r][c] denotes the weighted signal mean of coordinates (r, c), in[r+i][c+j] denotes an input pixel value at coordinates (r+i, c+j), weight[r+i][c+j] denotes a weight value for the pixel at the coordinates (r+i, c+j), and Sum_weight denotes the sum of weight values.

According to Algorithm 2, in the 5×5 mask with a target pixel at the coordinates (r, c) illustrated in FIG. 4A, every pixel in[r+i][c+j] is multiplied by its weight value weight[r+i][c+j]. The weighted pixels are summed and divided by the weight sum Sum_weight. The weight values and the weight sum Sum_weight are given by:

---
[Algorithm 3]
---
```
if(|in[r][c]– in[r – 1][c – j]| > Tm){
    weight[r + i][c + j] = 0;
}
else{
    weight[r + i][c + j] = (Tm –|in[r][c]– in[r – 1][c – j]|)/ Tm;
}
for(i = -2; i < 3; i + +){
    for(j = -2; j < 3; j + +){
        Sum _ weight+ = weight[r + i][c + j];
    }
}
```
---

In Algorithm 3, in[r][c] denotes the input pixel value of the target pixel in the 5×5 mask illustrated in FIG. 4A, Tm denotes the second threshold, weight[r+i][c+j] denotes the weight value for the pixel at the coordinates (r+i, c+j), and Sum_weight denotes the sum of weight values.

According to Algorithm 3, to compute a weight value for a current pixel in[r+i][c+j], the difference between the value of the target pixel and that of an opposite pixel in[r-i][c-j] is computed. If the difference is larger than Tm, the weight value for the current pixel is 0. Otherwise, the weight value is (Tm-|in[r][c]-in[r-i][c-j]|)/Tm. Sum_weight denotes the sum of the weight values of all pixels.

The weighted signal variance can be computed using the weighted signal mean calculated by Algorithm 2 and Algorithm 3, as follows.

---
[Algorithm 4]
---
```
for(i = -2; i < 3; i + +){
    for(j = -2; j < 3; j + +){
        var[r][c]+ = (in[r + i][c + j]– weight _ mean[r][c])² / 9;
    }
}
```
--- where var[r][c] denotes the weighted signal variance, in[r+i][c+j] denotes the input pixel value of the coordinates (r+i, c+j), and weight_mean[r][c] denotes the weighted mean of the pixel at the coordinates (r, c).

According to Algorithm 4, the weighted signal mean is subtracted from each pixel value, and then the difference is squared and divided by 9, and the division values are summed as the weighted signal variance.

Referring back to FIG. 2, in step 160, noise is finally eliminated using the weighted signal mean weight_mean[r][c] and the weighted signal variance var[r][c] computed by Algorithms 2, 3 and 4 in step 150, and the noise variance Vn estimated referring to Table 1 in step 130. The final noise elimination is expressed as $$out[r][c]= \quad (5)$$
$$weight\_mean[r][c]+\frac{var[r][c]}{var[r][c]+Vn}(in[r][c]-weight\_mean[r][c])$$

where out[r][c] denotes the final output of the pixel at the coordinates (r, c), var[r][c] denotes the weighted signal variance of the coordinates (r, c), in[r][c] denotes the input pixel values for the coordinates (r, c), weight_mean[r][c] denotes the weighted mean of the pixel at the coordinates (r, c), and Vn denotes the noise variance.

As is apparent from the above description, the present invention advantageously acquires a higher-quality image because defective pixels are detected and eliminated and thermal noise of an image sensor is eliminated by estimating a noise level using the mean of an image.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents. For one such example, while a Bayer filter is preferred, other colored filters can be used with the present invention.

What is claimed is:

1. A method for eliminating defective pixels and noise in an image sensor, comprising:
    extracting each pixel value of an image using a color filter;
    calculating a mean value of the extracted image;
    estimating a noise variance, estimating a first threshold for determining whether a pixel is defective, and estimating a second threshold for calculating a weight value for a pixel, from the mean value;
    determining whether each pixel is defective;
    calculating a weight value for the each pixel and calculating a weighted signal mean and a weighted signal variance of each pixel; and
    eliminating noise from the image using the noise variance, the weighted signal mean, and the weighted signal variance.

2. The method of claim 1, wherein the color filter comprises a Bayer filter.

3. The method of claim 1, wherein the mean value of the image comprises a mean value of all pixels of the image.

4. The method of claim 1, wherein the estimation comprises estimating the noise variance, the first threshold, and the second threshold referring to Table 2,

TABLE 2

|  | Td | Tm | Vn |
| --- | --- | --- | --- |
| mean < I080 | I020 | I060 | $(I016)^2$ |
| I080 ≦ mean < I120 | I040 | I055 | $(I015)^2$ |
| I120 ≦ mean < I160 | I060 | I050 | $(I014)^2$ |
| I160 ≦ mean < I200 | I080 | I045 | $(I013)^2$ |
| I200 ≦ mean < I240 | I100 | I040 | $(I012)^2$ |
| I240 ≦ mean < I180 | I120 | I035 | $(I011)^2$ |
| I280 ≦ mean | I140 | I035 | $(I010)^2$ | wherein mean denotes the mean value of the image, Td denotes the first threshold, Tm denotes the second threshold, and Vn denotes the noise variance and I * * * represents a percentage of the highest brightness.

5. The method of claim 1, wherein the determination comprises determining a pixel to be defective, if the pixel satisfies all of conditions, $DV_{S2}+Td>Dv1_{S0}$, $DV_{S2}+Td>DV2_{S0}$, $DH_{S1}+Td>DH1_{S0}$, $DH_{S1}+Td>DH2_{S0}$, and $DV_{S2}$, $DH_{S1}$, $DH1_{S0}$, $DH2_{S0}$, $DV1_{S0}$, and $DV2_{S0}$ are given as $$DV_{S2}=|in[r-1][c]-in[r+1][c]|$$

$$DH_{S1}=|in[r][c-1]-in[r][c+1]|$$

$$DH1_{S0}=|in[r][c-2]-in[r][c]|$$

$$DH2_{S0}=|in[r][c]-in[r][c+2]|$$

$$DV1_{S0}=|in[r-2][c]-in[r][c]|$$

$$DV2_{S0}=|in[r][c]-in[r+2][c] \qquad (6)$$

where in a 5×5 mask, in[r][c] denotes a pixel value of a target pixel at coordinates (r, c), in[r−1][c] denotes an input pixel value at coordinates (r−1, c), in[r+1][c] denotes an input pixel value at coordinates (r+1, c), in[r][c−1] denotes an input pixel value at coordinates (r, c−1), in[r][c+1] denotes an input pixel value at coordinates (r, c+1), in[r][c−2] denotes an input pixel value at coordinates (r, c−2), in[r][c+2] denotes an input pixel value at coordinates (r, c+2), in[r−2][c] denotes an input pixel value at coordinates (r−2, c), and in[r+2][c] denotes an input pixel value at coordinates (r+2, c).

6. The method of claim 1, further comprising replacing a pixel with the following value, if the pixel is determined to be defective, $$\frac{in[r-1][c-1]+in[r-1][c+1]+in[r+1][c-1]+in[r+1][c+1]}{4} \qquad (7)$$

where when in[r][c] is a pixel value of a target pixel at coordinates (r, c) in a 5×5 mask, in[r−i][c−j] denotes an input pixel value at coordinates (r−i, c−j), in[r−i][c+j] denotes an input pixel value at coordinates (r−i, c+j), in[r+i][c−j] denotes an input pixel value at coordinates (r+i, c−j), and in[r+i][c+j] denotes an input pixel value at coordinates (r+i, c+j).

7. The method of claim 1, wherein the weight value calculation comprises, when a pixel at coordinates (r, c) is set as a target pixel in a 5×5 mask and a current pixel is at coordinates (r+i, c+j):
    (i) determining the weight value for the current pixel to be 0, if equation (8) is satisfied; and
    (ii) calculating the weight value for the current pixel by equation (9), if equation (8) is not satisfied, $$|in[r][c]-in[r-i][c-j]|>Tm \qquad (8)$$

$$weight[r+i][c+j]=(Tm-|in[r][c]-in[r-i][c-j]|)/T_m \qquad (9)$$

where in [r][c] denotes an input pixel value of a target pixel at coordinates (r, c) in a 5×5 mask, Tm denotes the second threshold, and weight[r+i][c+j] denotes a weight value for a pixel at coordinates (r+i, c+j).

8. The method of claim 1, wherein the weighted signal mean calculation comprises multiplying each pixel by a weighted value calculated for the each pixel in a 5×5 mask with a target pixel being at coordinates (r, c), summing all weighted pixels, and dividing the sum of all the weighted pixels by the sum of the weight values.

9. The method of claim 8, wherein the sum of weight values comprises the sum of the weight values of all pixels in the 5×5 mask with the target pixel being at coordinates (r, c).

10. The method of claim 1, wherein the weighted signal variance calculation comprises subtracting the weighted signal mean from each pixel in a 5×5 mask with a target pixel being at coordinates (r, c), squaring the difference, dividing the square by 9, and summing the division values of all pixels as the weighted signal variance.

11. The method of claim 1, wherein the noise elimination comprises eliminating the noise by $$out[r][c] = weight\_mean[r][c] + \frac{var[r][c]}{var[r][c]+Vn}(in[r][c]-weight\_mean[r][c]) \qquad (10)$$

where out[r][c] denotes a final output of a pixel at the coordinates (r, c), var[r][c] denotes the weighted signal variance of the coordinates (r, c), in[r][c] denotes an input pixel value at the coordinates (r, c), weight_mean[r][c] denotes the weighted mean of the pixel at the coordinates (r, c), and Vn denotes the noise variance.

12. An apparatus for eliminating defective pixels and noise in an image sensor, comprising:
- means for extracting each pixel value of an image using a color filter;
- means for calculating a mean value of the extracted image;
- means for estimating a noise variance, means for estimating a first threshold for determining whether a pixel is defective, and means for estimating a second threshold for calculating a weight value for a pixel, from the mean value;
- means for determining whether each pixel is defective;
- means for calculating a weight value for the each pixel and calculating a weighted signal mean and a weighted signal variance of each pixel; and
- means for eliminating noise from the image using the noise variance, the weighted signal mean, and the weighted signal variance.

13. The apparatus of claim 12, wherein the color filter comprises a Bayer filter.

14. The apparatus of claim 12, wherein the mean value of the image comprises a mean value of all pixels of the image.

15. The apparatus of claim 12, further comprising includes a lens system for focusing light onto one spot, an image sensor configured with a CMOS or a CCD for opto-electically converting an input optical signal to an electrical signal, and an image processor for processing an input image signal received from the image sensor.

16. The apparatus according to claim 15, wherein the image sensor opto-electrically converting the optical signal to an analog electrical signal.

17. The apparatus according to claim 15, wherein for the input of the electrical signal, the image processor processes a Red, Green, and Blue (RGB) image signal.

* * * * *